(12) United States Patent
Ohkura

(10) Patent No.: US 9,742,452 B2
(45) Date of Patent: Aug. 22, 2017

(54) RECEIVER, RECEIVING METHOD FOR RECEIVING RF SIGNAL IN SUPERHETERODYNE SYSTEM

(71) Applicant: JVC KENWOOD Corporation, Yokohama-shi (JP)

(72) Inventor: Motohiro Ohkura, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 14/938,027

(22) Filed: Nov. 11, 2015

(65) Prior Publication Data
US 2016/0142161 A1   May 19, 2016

(30) Foreign Application Priority Data
Nov. 14, 2014 (JP) ................... 2014-231358

(51) Int. Cl.
| | | |
|---|---|---|
| H04L 27/08 | (2006.01) |
| H04N 5/50 | (2006.01) |
| H04B 1/16 | (2006.01) |
| H04B 1/00 | (2006.01) |
| H04B 1/12 | (2006.01) |
| H04B 1/28 | (2006.01) |
| H04B 15/04 | (2006.01) |

(52) U.S. Cl.
CPC ........... *H04B 1/16* (2013.01); *H04B 1/001* (2013.01); *H04B 1/123* (2013.01); *H04B 1/28* (2013.01); *H04B 15/04* (2013.01)

(58) Field of Classification Search
CPC .... H04B 1/0475; H04B 1/006; H04B 1/1638; H04B 1/001; H04B 1/1081; H04B 10/11; H04B 17/318

USPC .......................................... 375/345; 348/731
See application file for complete search history.

(56) References Cited

U.S. PATENT DOCUMENTS

| | | | | |
|---|---|---|---|---|
| 2,954,465 A | * | 9/1960 | White | H03J 7/32 324/76.27 |
| 5,105,165 A | * | 4/1992 | Bien | H03F 1/302 327/100 |
| 5,852,772 A | * | 12/1998 | Lampe | H03G 3/3068 455/226.2 |
| 6,985,035 B1 | * | 1/2006 | Khorramabadi | H01F 17/0006 330/149 |

(Continued)

FOREIGN PATENT DOCUMENTS

JP        07-235886       9/1995

*Primary Examiner* — Daniel Washburn
*Assistant Examiner* — Sarah Hassan
(74) *Attorney, Agent, or Firm* — Venable LLP; Michael A. Sartori; F. Brock Riggs

(57) ABSTRACT

A local oscillator outputs a local oscillator signal that provides an upper side heterodyne mode or a lower side heterodyne mode for a received RF signal. A first converter converts the received RF signal into an IF signal, based on the local oscillator signal output from the local oscillator. An FM detector subjects the IF signal produced by conversion to detection. A first measurement unit measures a signal intensity of the IF signal before the IF signal is input to the FM detector. A second measurement unit measures a squelch voltage of a signal detected by the FM detector. A controller that controls the local oscillator based on the signal intensity measured by the first measurement unit and the squelch voltage measured by the second measurement unit.

7 Claims, 5 Drawing Sheets

(56) References Cited

U.S. PATENT DOCUMENTS

| | | | |
|---|---|---|---|
| 7,330,707 B2* | 2/2008 | Okanobu | H04B 1/28 |
| | | | 455/133 |
| 2002/0047942 A1* | 4/2002 | Vorenkamp | H04N 5/455 |
| | | | 348/731 |
| 2003/0020544 A1* | 1/2003 | Behzad | H01F 17/0006 |
| | | | 330/254 |
| 2005/0026581 A1* | 2/2005 | Wood | H04L 25/085 |
| | | | 455/219 |
| 2005/0266806 A1* | 12/2005 | Soe | H04B 1/403 |
| | | | 455/88 |
| 2008/0070539 A1* | 3/2008 | He | H04B 17/21 |
| | | | 455/305 |
| 2011/0151814 A1* | 6/2011 | Takeuchi | H04B 1/1036 |
| | | | 455/213 |

\* cited by examiner

RECEIVER, RECEIVING METHOD FOR RECEIVING RF SIGNAL IN SUPERHETERODYNE SYSTEM

CROSS-REFERENCE TO RELATED APPLICATION

This application is based upon and claims the benefit of priority from the prior Japanese Patent Application No. 2014-231358, filed on Nov. 14, 2014, the entire contents of which are incorporated herein by reference.

BACKGROUND

1. Field of the Invention

The present invention relates to a reception technology and, more particularly, to a receiver and receiving method for receiving an RF signal in a superheterodyne system.

2. Description of the Related Art

A superheterodyne receiver is provided with a frequency synthesizer. The superheterodyne receiver converts a received signal into an intermediate frequency signal by mixing a local oscillator frequency signal successively generated by the synthesizer with the received signal. The superheterodyne receiver searches for the received signal by subjecting the intermediate frequency signal to frequency description. The signal received in a superheterodyne receiver may not be a target signal (desired signal). This is due to the reception of an image signal or a spurious signal. It is therefore necessary to discriminate an image signal and a spurious signal. This is addressed by receiving two channels (local oscillator frequency±intermediate frequency) simultaneously and searching a width equal to twice the frequency of the intermediate frequency, and then shifting the local oscillator frequency by an amount equal to twice the intermediate frequency before searching, again, a width centered at the post-shift frequency and equal to twice the intermediate frequency (see, for example, patent document 1).

[patent document 1] Japanese Patent Application Publication No. Hei7-235886

Suspension of a scan for a reception frequency due to the reception of an image signal requires operating the radio apparatus to resume the scan. The extra job bothers the user of the radio apparatus. Further, the scan is started/suspended repeatedly to search for a reception signal so that the result that the scanning speed is lowered. Further, if a strong signal is found in an adjacent channel, a signal is detected in the adjacent channel in which that signal is found with the result that the scan is suspended.

SUMMARY

To address the aforementioned issue, the receiver according to an embodiment comprises: a reception unit that receives an RF signal; a local oscillator that outputs a local oscillator signal that provides an upper side heterodyne mode or a lower side heterodyne mode for the RF signal received by the reception unit; a converter that converts the RF signal received by the reception unit into an IF signal, based on the local oscillator signal output from the local oscillator; a detector that subjects the IF signal produced by conversion in the converter to detection; a first measurement unit that measures a signal intensity of the IF signal before the IF signal is input to the detector; a second measurement unit that measures a squelch voltage of a signal detected by the detector; and a controller that controls the local oscillator based on the signal intensity measured by the first measurement unit and the squelch voltage measured by the second measurement unit. The controller determines that a signal is available at a frequency of the RF signal if the signal intensity in the upper side heterodyne mode and the signal intensity in the lower side heterodyne mode are both higher than a first threshold value, and if the squelch voltage is lower than the second threshold value, and determines that a signal is not available at the frequency of the RF signal if any of conditions is not met.

Another embodiment relates to a receiving method. The method comprises: converting a received RF signal into an IF signal, based on a local oscillator signal in an upper side heterodyne mode or a lower side heterodyne mode; measuring a signal intensity of the IF signal; measuring a squelch voltage in the IF signal subjected to detection, if the signal intensity in the upper side heterodyne mode and the signal intensity in the lower side heterodyne mode are both higher than a first threshold value; determining that a signal is available at a frequency of the RF signal if the squelch voltage is lower than a second threshold value; and determining that a signal is not available at the frequency of the RF signal if at least one of the signal intensity in the upper side heterodyne mode and the signal intensity in the lower side heterodyne mode is equal to or lower than the first threshold value, or if the squelch voltage is equal to or higher than the second threshold value.

Optional combinations of the aforementioned constituting elements, and implementations in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

Example 1

A summary will be given before describing the invention in specific details. Example 1 relates to a receiver having a superheterodyne system and having a frequency scanning function for determining the received frequency. As mentioned above, a scan may be suspended in the event that waves of disturbance by an image signal or disturbance by a signal on an adjacent channel are detected in false detection. In other words, it is hoped that suspension of a scan due to false detection of signals other than a desired signal (e.g., reception of an image signal or reception of disturbing waves from an adjacent channel) be avoided.

To address this, the receiver according to an embodiment determines that an image signal is received when the receiver detects a signal in one of the upper side heterodyne mode or the lower side heterodyne mode but does not detect a signal by switching the heterodyne mode to the other side. In these two steps of detection, a received signal strength indicator (RSSI) is used to reduce the detection time. Therefore, the scan speed is increased. If it is determined that reception in either step occurs at the frequency to which the desired signal is assigned, the receiver performs a third step of detection based on a squelch voltage that allows more accurate determination as to whether a signal is available.

Figure 1:
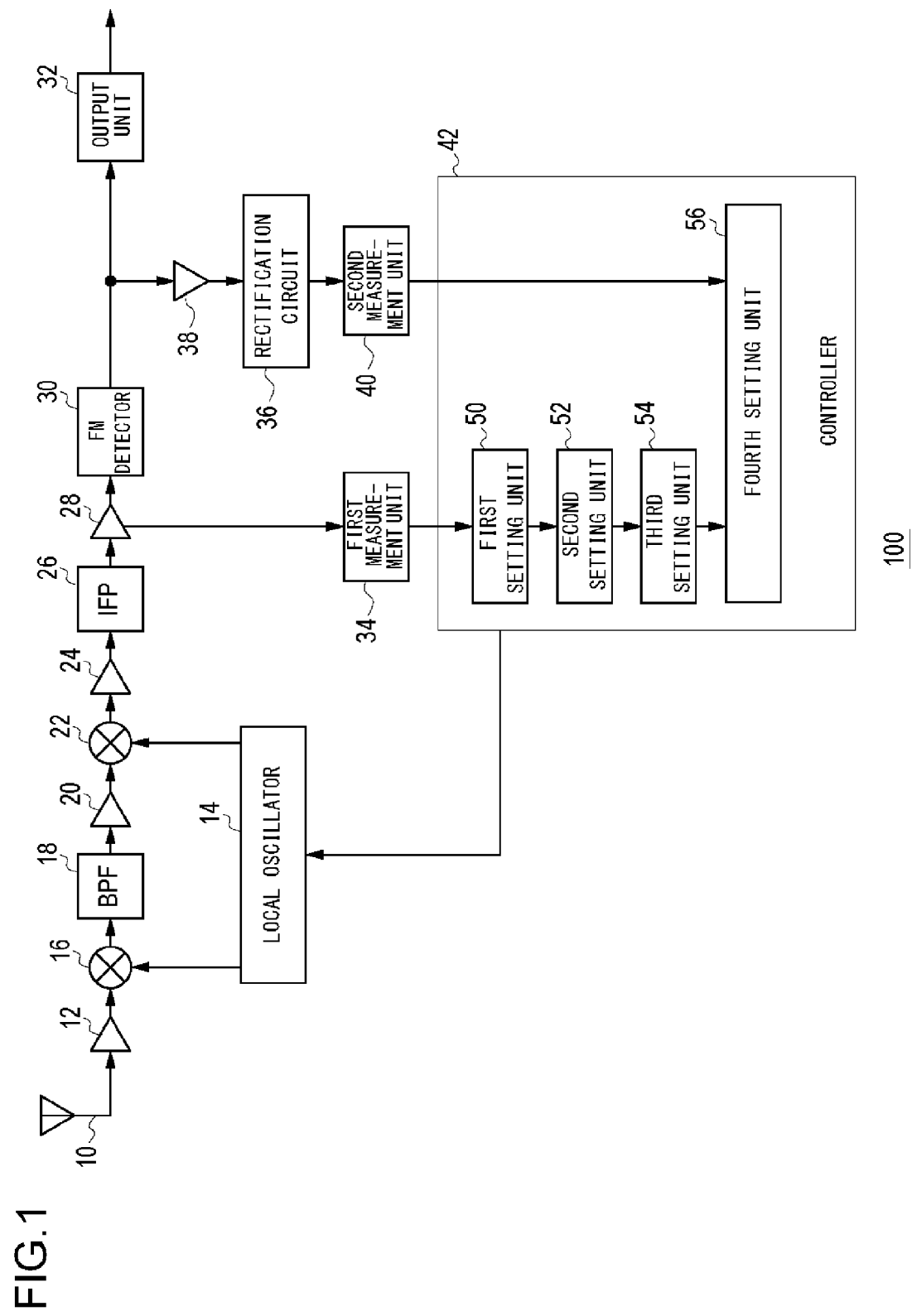
FIG. 1 shows the configuration of the receiver according to Example 1.

FIG. 1 shows the configuration of a receiver 100 according to Example 1. The receiver 100 includes an antenna 10, a first amplifier 12, a local oscillator 14, a first converter 16, a band-pass filter (BPF) 18, a second amplifier 20, a second converter 22, a third amplifier 24, an IF filter (IFF) 26, a limiter 28, a frequency modulation (FM) detector 30, an output unit 32, a first measurement unit 34, a rectification circuit 36, a noise amplifier 38, a second measurement unit 40, and a controller 42. The controller 42 includes a first setting unit 50, a second setting unit 2, a third setting unit 54, and a fourth setting unit 56.

The antenna 10 receives a radio signal of an FM modulation scheme or a radio signal in FM broadcasting. For example, the frequency of the radio signal is included in a range 0.1 MHz-1.3 GHz. Hereinafter, signals having such a radio frequency will be referred to as radio frequency (RF) signals. For clarity of the explanation, the radio frequency subject to processing will be denoted by "fc". The antenna 10 outputs the RF signal to the first amplifier 12. The first amplifier 12 receives the RF signal from the antenna 10 and amplifies the RF signal. The first amplifier 12 outputs the amplified RF signal (hereinafter, also referred to as "RF signal") to the first converter 16.

The local oscillator 14 output the first local oscillator signal to the first converter 16. The first local oscillator signal provides the upper side heterodyne mode or lower side heterodyne mode for the RF signal. Denoting the intermediate frequency by "$f_{IF}$", the first local oscillator signal "$f_{LO1}$" for the upper side heterodyne mode is given by "fc+$f_{IF}$". Meanwhile, the first local oscillator signal "$f_{LO2}$" for the lower side heterodyne mode is denoted by "fc-$f_{IF}$". Whether the signal is output in the upper side heterodyne mode or the lower side heterodyne mode is determined by an instruction from the controller 42. For example, the frequency of the first local oscillator signal is set in a range 58.15 MHz-1358.05 MHz. The local oscillator 14 also outputs the second local oscillator signal to the second converter 22. The frequency of the second local oscillator signal is fixed to, for example, 57.6 MHz. The first local oscillator signal and the second local oscillator signal may be generated by using a signal from the same oscillator as a source of the basic frequency.

The first converter 16 receives the RF signal from the first amplifier 12 and receives the first local oscillator signal from the local oscillator 14. The first converter 16 is implemented by a mixer and converts the RF signal into the first intermediate frequency (IF) signal based on the first local oscillator signal. For example, the frequency $f_{IF}$ of the first IF signal is 58.05 MHz. In order to make the IF frequency constant, the frequency of the first local oscillator signal is changed in the local oscillator 14 in accordance with the frequency of the RF signal.

If the first local oscillator signal is in the upper side heterodyne mode, the first converter 16 generates the $f_{IF}$ signal and the $f_{LO1}$+fc signal, where the former represents the first IF signal. The latter is attenuated by the BPF 18 described later. If the first local oscillator signal is in the lower side heterodyne mode, the first converter 16 generates the $f_{IF}$ signal and the $f_{LO2}$+fc signal, where the former represents the first IF signal. The latter is attenuated by the BPF 18 described later.

In the case of upper side heterodyne mode, the fc+$2f_{IF}$ signal is also converted into the fc+$2f_{IF}$ signal by the first local oscillator signal. The fc+$2f_{IF}$ signal is called an image signal. The image signal is also converted into the same frequency as that of the first IF signal by frequency conversion. fc+$2f_{IF}$ is called an image frequency. In the case of lower side heterodyne mode, the fc−$2f_{IF}$ signal is also converted into the $f_{IF}$ signal by the first local oscillator signal. The fc−$2f_{IF}$ signal is called an image signal. The image signal is also converted into the same frequency as that of the first IF signal by frequency conversion. fc−$2f_{IF}$ is called an image frequency.

The BPF 18 receives the signal from the first converter 16 and attenuates the $f_{LO1}$+fc signal in the case of the upper side heterodyne mode or attenuates the $f_{LO2}$+fc signal in the case of the lower side heterodyne mode. The BPF 18 outputs the first IF signal to the second amplifier 20. The second amplifier 20 receives the first IF signal from the BPF 18 and amplifies the first IF signal. The second amplifier 20 outputs the amplified first IF signal (hereinafter, also referred to as "first IF signal") to the second converter 22.

The second converter 22 receives the first IF signal from the second amplifier 20 and receives the second oscillator signal from the local oscillator 14. Like the first converter 16, the second converter 22 is implemented by a mixer and converts the first IF signal to the second IF signal based on the second oscillator signal. For example, the frequency of the second IF signal is 450 kHz. The second converter 22 outputs the second IF signal to the third amplifier 24. The third amplifier 24 receives the second IF signal from the second converter 22 and amplifies the second IF signal. The third amplifier 24 outputs the amplified second IF signal (hereinafter, also referred to as "second IF signal") to the IFF 26.

The IFF 26 receives the signal from the third amplifier 24 and attenuates the components other than the second IF signal. For example, the IFF 26 has a pass band of 450±5 kHz. The IFF 26 outputs the second IF signal to the limiter 28. The limiter 28 receives the second IF signal from the IFF 26 and subjects the second IF signal to amplification and amplitude limitation. The limiter 28 outputs the second IF signal subjected to amplification and amplitude limitation (hereinafter, also referred to as "second IF signal") to the FM detector 30. The limiter 28 also outputs the signal intensity of the second IF signal to the first measurement unit 34 as an RSSI voltage.

The FM detector 30 generates a detection signal by receiving the second IF signal from the limiter 28 and subjecting the second IF signal to FM detection. The detection signal is a baseband signal. The FM detector 30 outputs the detection signal to the output unit 32 and the noise amplifier 38. The output unit 32 receives the detection signal from the FM detector 30, generates an audio signal by amplifying the detection signal, and causes the audio signal to be output from a speaker or a headphone (not shown). The first measurement unit 34 measures the RSSI voltage from the limiter 28, i.e., the signal intensity of the second IF signal before it is input to the FM detector 30. The first measurement unit 34 converts the RSSI voltage from an analog value into a digital value before measuring the voltage. The first measurement unit 34 outputs a measurement result converted into a digital value (hereinafter, also referred to as "RSSI voltage") to the controller 42.

Figure 2:
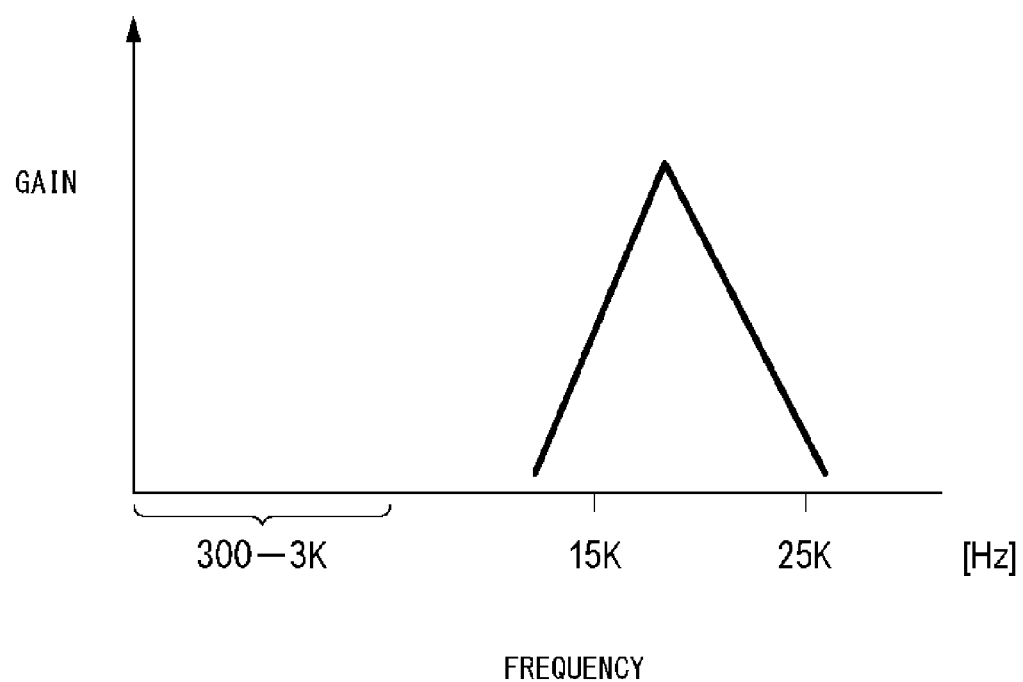
FIG. 2 shows the frequency characteristic of the noise amplifier of FIG. 1.

The noise amplifier 38 receives the detection signal from the FM detector 30 and amplifies the detection signal. The gain of the noise amplifier 38 has a frequency characteristic. FIG. 2 shows the frequency characteristic of the noise amplifier 38. The horizontal axis represents frequency and the vertical axis represents gain. As shown in the graph, the gain in a range from 15 kHz to 25 kHz outside the band of the detection signal is higher than the gain in the band of the detection signal from 300 Hz to 3 kHz. The frequency band allows components outside the band of the detection signal, rather than amplifying the detection signal, to be amplified so that squelch noise will be the main component in the resultant signal. The rectification circuit 36 receives the detection signal from the noise amplifier 38 and rectifies the detection signal. The rectification circuit 36 outputs the rectified detection signal (hereinafter, also referred to as "detection signal") to the second measurement unit 40 as squelch noise.

The second measurement unit 40 measures the squelch voltage of the detection signal, i.e., the voltage of squelch noise from the rectification circuit 36. The second measurement unit 40 converts the squelch noise from an analog value into a digital value before measuring the voltage. The second measurement unit 40 outputs a measurement result converted into a digital value (hereinafter, also referred to as "squelch voltage") to the controller 42.

The controller 42 controls the local oscillator 14 based on the RSSI voltage measured by the first measurement unit 34 and the squelch voltage measured by the second measurement unit 40. The first setting unit 50 assumes the frequency of the RF signal from the first amplifier 12 to be "fc" and sets the first local oscillator signal output from the local oscillator 14 in one of the upper side heterodyne mode and the lower side heterodyne mode with respect to the assumed frequency. In this case, it is assumed that the upper side heterodyne mode is set. Thus, the first setting unit 50 sets the first local oscillator signal at the frequency "$f_{LO1}$", which is equal to fc+$f_{IF}$.

The second setting unit 52 acquires the RSSI voltage once the setting is made in the first setting unit 50. The RSSI voltage will indicate the signal intensity received in the upper side heterodyne mode. The second setting unit 52 compares the RSSI signal with the first threshold value. The first threshold value is preset by computer simulation or experiments. If the RSSI voltage is higher than the first threshold value so that the first condition is met, the second setting unit 52 determines that a signal is available. Associated with this, the second setting unit 52 changes the first local oscillator signal output from the local oscillator 14 from the upper side heterodyne mode to the lower side heterodyne mode. Thus, the second setting unit 52 sets the first local oscillator signal at the frequency "$f_{LO2}$", which is equal to fc-$f_{IF}$. If the first condition is not met on the other hand, the second setting unit 52 determines that a signal is not available and notifies the fourth setting unit 56 of the result of determination.

The third setting unit 54 acquires the RSSI voltage once the setting is made in the second setting unit 52. The RSSI voltage will indicate the signal intensity received in the lower side heterodyne mode. The third setting unit 54 compares the RSSI signal with the first threshold value. If the RSSI voltage is higher than the first threshold value so that the second condition is met, the second setting unit 52 determines that a signal is available and that the signal received in the second setting unit 52 is not an image signal. Associated with this, the third setting unit 54 sets the first local oscillator signal output from the local oscillator 14 to one of upper side heterodyne mode and the lower side heterodyne mode normally used for reception. In this case, the third setting unit 54 changes to the upper side heterodyne mode. If the second condition is not met on the other hand, the second setting unit 52 determines that a signal is not available and the signal received in the second setting unit 52 is an image signal, and notifies the fourth setting unit 56 of the result of determination.

The fourth setting unit 56 acquires the squelch voltage once the third setting unit 54 sets the first local oscillator signal to the mode normally used for reception. The third setting unit 54 compares the squelch voltage with the second threshold value. Like the first threshold value, the second threshold value is also preset by computer simulation or experiments. If the squelch voltage is lower than the second threshold value so that the third condition is met, the third setting unit 54 determines that a signal is available. This can be said to be a state in which the noise level outside the demodulation band is suppressed. Associated with this, the third setting unit 54 fixes the frequency of the first local oscillator signal output from the local oscillator 14 at the current value. Therefore, the scan is suspended.

If the third condition is not met on the other hand, the third setting unit 54 determines that a signal is not available and there is interruption from a signal on an adjacent channel. This can be said to be a state in which the noise level outside the demodulation band is not suppressed. In other words, the signal on the adjacent channel is received outside the pass band 450±5 kHz of the IFF 26. However, the signal level is so high that it is distorted by the limiter 28 that detects RSSI. Due to the signal generated by the distortion, the RSSI voltage is detected before and after the heterodyne mode is switched. The signal generated by the distortion and detected by the FM detector 30 will only result in noise so that the noise in the band of the noise amplifier 38 is not suppressed and the squelch voltage is not lowered.

If the first condition is not met in the second setting unit 52, or if the second condition or the third condition is not met in the third setting unit 54, the fourth setting unit 56 changes the frequency "fc" of the first local oscillator signal output from the local oscillator 14 and causes the first setting unit 50 to initiate the process. In response, the first setting unit 50 sets the mode to the upper side heterodyne mode. In this way, the scan is continued for the new frequency. In other words, the scan is not suspended due to an image signal or interruption from an adjacent channel and so can be suspended with precision.

As described above, the controller 42 fixes the frequency of the first local oscillator signal provided that both the signal intensity occurring when the upper side heterodyne mode is set and the signal intensity occurring when the lower side heterodyne mode is set are higher than the first threshold value, and provided additionally that the squelch voltage is lower than the second threshold value. Meanwhile, the controller 42 changes the frequency of the first local oscillator signal if any one of the conditions above is not met.

The features are implemented in hardware such as a CPU of a computer, a memory, or other LSI's, and in software such as a program loaded into a memory, etc. The figure depicts functional blocks implemented by the cooperation of these elements. Therefore, it will be obvious to those skilled in the art that the functional blocks may be implemented in a variety of manners by hardware only or by a combination of hardware and software.

Figure 3:
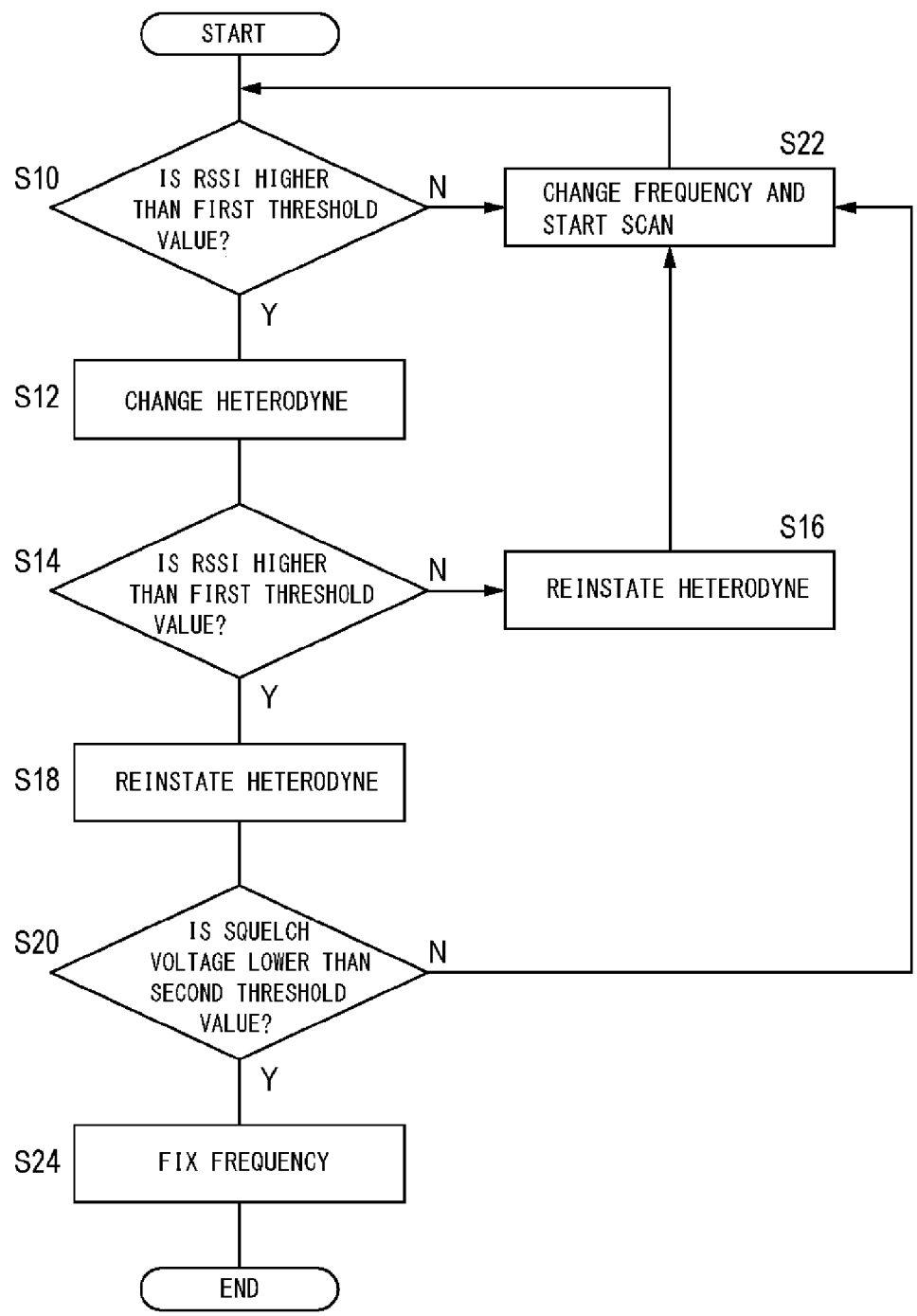
FIG. 3 is a flow chart showing the procedure for scanning in the receiver of FIG. 1.

A description will now be given of the operation of the receiver 100 having the configuration described above. FIG. 3 is a flow chart showing the procedure for scanning in the receiver 100. If RSSI is higher than the first threshold value (Y in S10), the second setting unit 52 changes the heterodyne mode (S12). If RSSI is higher than the first threshold value (Y in S14), the second setting unit 52 reinstates the heterodyne mode (S18). If the squelch voltage is lower than the second threshold value (Y in S20), the fourth setting unit 56 fixes the frequency (S24). If RSSI is not higher than the first threshold value (N in S10), the first setting unit 50 changes the frequency and resumes the scan (S22) before returning to step 10. If RSSI is not higher than the first threshold value (N in S14), the first setting unit 50 reinstates the heterodyne mode (S16), changes the frequency and resumes the scan (S22) before returning to step 10. If the squelch voltage is not lower than the second threshold value (N in S20), the first setting unit 50 changes and frequency and resumes the scan (S22) before returning to step 10.

According to the Example, the signal is detected by using the upper side heterodyne mode and the lower side heterodyne mode so that suspension of a scan due to the reception of an image signal is avoided. Because the signal is detected based on the RSSI voltage, the detection time is reduced. If a signal that is not an image signal is received, the squelch voltage is monitored so that the impact from a signal on an adjacent channel is reduced. If the impact from a signal on an adjacent channel is large, the scan is continued so that suspension of the scan due to a large impact from a signal on an adjacent channel is avoided. Because monitoring is performed based on the squelch voltage, precision of detecting a signal on an adjacent channel is improved. Further, by avoiding suspension of a scan due to the reception of an image signal, the scan speed is improved. Coupled with the process of identifying an image signal by switching the heterodyne mode, the above approach prevents suspension of a scan due to a large input signal on an adjacent channel.

Example 2

A description will now be given of Example 2. Like Example 1, Example 2 relates to a receiver having a superheterodyne system and having a frequency scanning function for determining the received frequency. The receiver according to Example 1 returns the first local oscillator signal to the upper side heterodyne mode before scanning for a new frequency. On the other hand, the receiver according to Example 2 scans for a new frequency by outputting the first local oscillator signal in the upper side heterodyne mode or the lower side heterodyne mode that has been used until then. In other words, provided that an RF signal is not detected by using the lower side heterodyne mode, the receiver scans for a new frequency by maintaining the setting of the lower side heterodyne mode and outputting the first local oscillator signal accordingly. The receiver according to Example 2 is of the same type as that of FIG. 1. The difference will be highlighted in the description below.

If the first condition is not met in the second setting unit 52, or if the second condition or the third condition is not met in the third setting unit 54, the fourth setting unit 56 changes the frequency "fc" of the first local oscillator signal output from the local oscillator 14 and causes the second setting unit 52 to initiate the process. In this process, the second setting unit 52 starts the process without changing the setting of the upper side heterodyne mode or the lower side heterodyne mode already established. In other words, the fourth setting unit 56 causes the second setting unit 52 to initiate the process, maintaining the upper side heterodyne mode or the lower side heterodyne mode already set.

Figure 4:
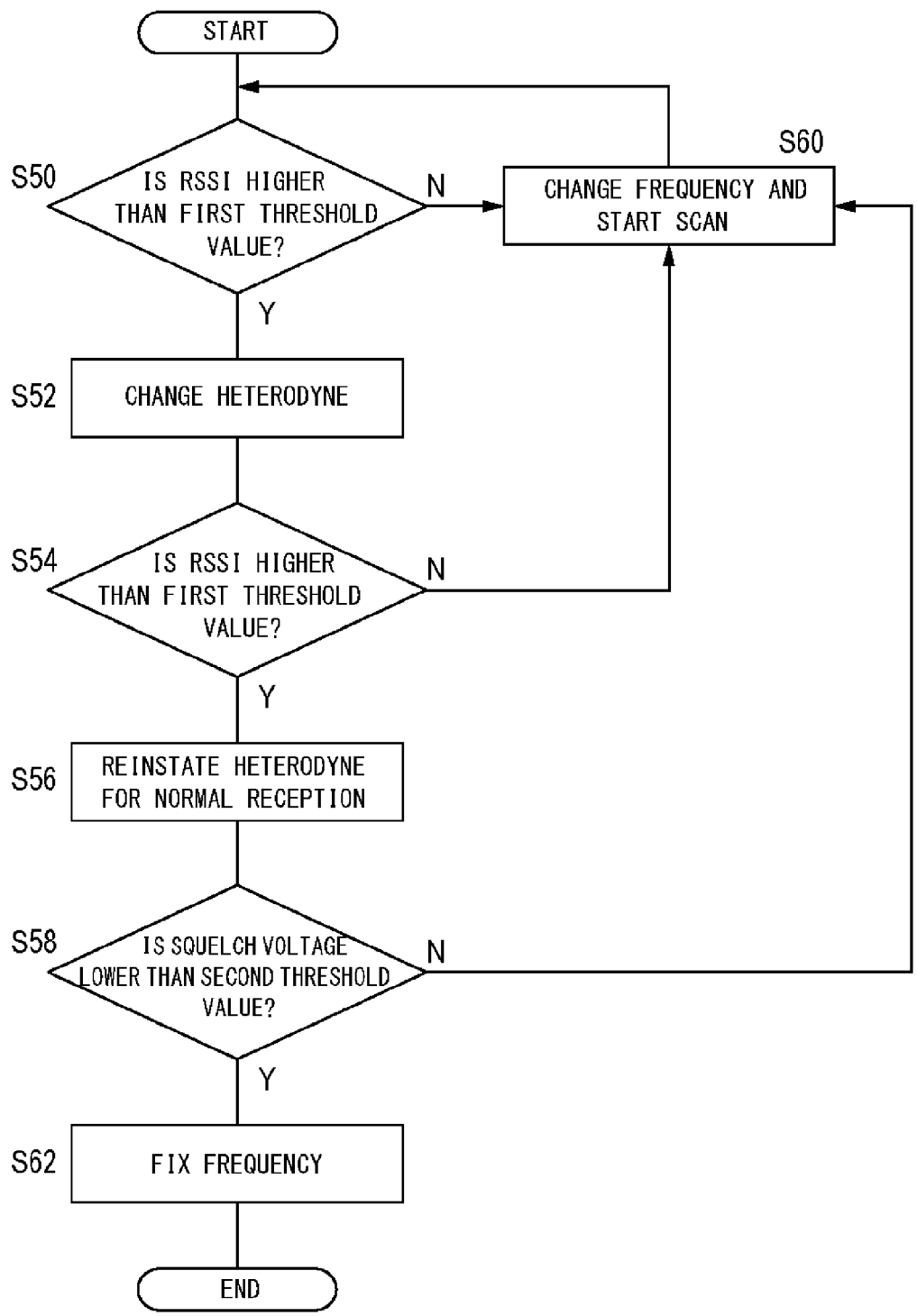
FIG. 4 is a flow chart showing the procedure for scanning in the receiver according to Example 2.

FIG. 4 is a flow chart showing the procedure for scanning in the receiver 100 according to Example 2. If RSSI is higher than the first threshold value (Y in S50), the second setting unit 52 changes the heterodyne mode (S52). If RSSI is higher than the first threshold value (Y in S54), the third setting unit 54 reinstates the heterodyne mode normally used for reception (S56). If the squelch voltage is lower than the second threshold value (Y in S58), the fourth setting unit 56 fixes the frequency (S62). If RSSI is not higher than the first threshold value (N in S50), the second setting unit 52 changes the frequency and resumes the scan (S60) before returning to step 50. If RSSI is not higher than the first threshold value (N in S54), the second setting unit 52 changes the frequency and resumes the scan (S60) before returning to step 50. If the squelch voltage is not lower than the second threshold value (N in S58), the second setting unit 52 changes and frequency and resumes the scan (S60) before returning to step 50.

According to this example, the step of switching the heterodyne mode is omitted so that the processing speed is increased.

Example 3

A description will now be given of Example 3. Like the foregoing examples, Example 3 relates to a receiver having a superheterodyne system and having a frequency scanning function for determining the received frequency. The feature of Example 3 concerns the configuration of the local oscillator. The local oscillator according to Example 3 is provided with at least two local oscillators. Given that one of the local oscillators is set to the upper side heterodyne mode, the other is set to the lower side heterodyne mode. The receiver according to Example 3 is of the same type as that of FIG. 1. The difference will be highlighted in the description below.

Figure 5:
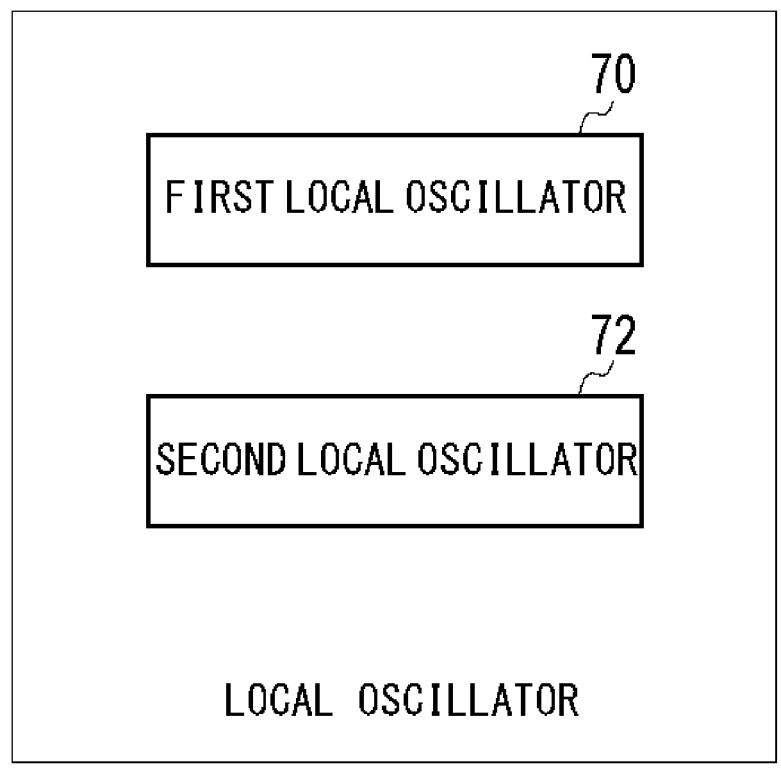
FIG. 5 shows the configuration of the local oscillator according to Example 3.

FIG. 5 shows the configuration of the local oscillator 14 according to Example 3. The local oscillator 14 includes a first local oscillator 70 for generating the first local oscillator signal $f_{LO1}$, a second local oscillator 72 for generating the first local oscillator signal $f_{LO2}$, and an oscillator (not shown) for generating a second local oscillator signal. The first local oscillator 70 outputs the local oscillator signal $f_{LO1}$ in the upper side heterodyne mode with respect to the frequency "fc". Meanwhile, the second local oscillator 72 outputs the local oscillator signal $f_{LO2}$ in the lower side heterodyne mode with respect to the frequency "fc". The first local oscillator 70 may output the local oscillator signal in the lower side heterodyne mode and the second local oscillator 72 may output the local oscillator signal in the upper side heterodyne mode. If one of the upper side heterodyne mode and the lower side heterodyne mode continues to be used before and after the frequency "fc" is changed, one of the first local oscillator 70 and the second local oscillator 72 may be used before the frequency "fc" is changed and the other may be used after the frequency "fc" is changed. In other words, the first local oscillator 70 and the second local oscillator 72 may be alternately used.

According to this example, the first local oscillator and the second local oscillator are switched for use so that the speed of switching the frequency is increased.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. A receiver comprising:
   a reception unit that receives an RF signal;
   a local oscillator that outputs a local oscillator signal that provides an upper side heterodyne mode or a lower side heterodyne mode for the RF signal received by the reception unit;
   a converter that converts the RF signal received by the reception unit into an IF signal, based on the local oscillator signal output from the local oscillator;
   a detector that subjects the IF signal produced by conversion in the converter to detection;
   a first measurement unit that measures a signal intensity of the IF signal before the IF signal is input to the detector;
   a second measurement unit that measures a squelch voltage of a signal detected by the detector; and
   a controller that controls the local oscillator based on the signal intensity measured by the first measurement unit and the squelch voltage measured by the second measurement unit, wherein
   the controller determines that a signal is available at a frequency of the RF signal if the signal intensity in the upper side heterodyne mode and the signal intensity in the lower side heterodyne mode are both higher than a first threshold value, and if the squelch voltage is lower than a second threshold value, and determines that a signal is not available at the frequency of the RF signal if any of conditions is not met,
   the controller includes a scanning function to scan for a frequency of the RF signal by changing a frequency of the local oscillator signal, and
   the controller suspends a scan if the controller determines that a signal is available at the frequency of the RF signal and continues a scan if the controller determines that a signal is not available at the frequency of the RF signal.

2. The receiver according to claim 1, wherein the controller comprises:
   a first setting unit that sets the local oscillator signal output from the local oscillator in one of the upper side heterodyne mode and the lower side heterodyne mode;
   a second setting unit that sets the local oscillator signal output from the local oscillator in the other of the upper side heterodyne mode and the lower side heterodyne mode, if a first condition is met in which the signal intensity in one of the modes set by the first setting unit is higher than the first threshold value;
   a third setting unit that sets the local oscillator signal output from the local oscillator in one of the upper side heterodyne mode and the lower side heterodyne mode normally used for reception, if a second condition is met in which the signal intensity in the other of the modes set by the second setting unit is higher than the first threshold value; and
   a fourth setting unit that determines that a signal is available at the frequency of the RF signal if a third condition is met in which the squelch voltage in one of the modes set by the third setting unit and normally used for reception is lower than a second threshold value, wherein
   if the first condition is not met in the second setting unit, or if the second condition or the third condition is not met in the third setting unit, the fourth setting unit determines that a signal is not available at the frequency of the RF signal and causes the first setting unit to resume a process.

3. The receiver according to claim 1, wherein the controller comprises:
   a first setting unit that sets the local oscillator signal output from the local oscillator in one of the upper side heterodyne mode and the lower side heterodyne mode;
   a second setting unit that sets the local oscillator signal output from the local oscillator in the other of the upper side heterodyne mode and the lower side heterodyne mode, if a first condition is met in which the signal intensity in one of the modes set by the first setting unit is higher than the first threshold value;
   a third setting unit that sets the local oscillator signal output from the local oscillator in one of the upper side heterodyne mode and the lower side heterodyne mode normally used for reception, if a second condition is met in which the signal intensity in the other of the modes set by the second setting unit is higher than the first threshold value; and
   a fourth setting unit that determines that a signal is available at the frequency of the RF signal if a third condition is met in which the squelch voltage in one of the modes set by the third setting unit and normally used for reception is lower than a second threshold value, wherein
   if the first condition is not met in the second setting unit, or if the second condition or the third condition is not met in the third setting unit, the fourth setting unit determines that a signal is not available at the frequency of the RF signal and causes the second setting unit to resume a process, maintaining the upper side heterodyne mode or the lower side heterodyne mode already set.

4. The receiver according to claim 1, wherein the local oscillator includes:
   a first local oscillator that generates a local oscillator signal in the upper side heterodyne mode; and
   a second local oscillator that generates a local oscillator signal in the lower side heterodyne mode.

5. The receiver according to claim 2, wherein the local oscillator includes:
   a first local oscillator that generates a local oscillator signal in the upper side heterodyne mode; and
   a second local oscillator that generates a local oscillator signal in the lower side heterodyne mode.

6. The receiver according to claim 3, wherein the local oscillator includes:
   a first local oscillator that generates a local oscillator signal in the upper side heterodyne mode; and
   a second local oscillator that generates a local oscillator signal in the lower side heterodyne mode.

7. A receiving method comprising:
   converting a received RF signal into an IF signal, based on a local oscillator signal in an upper side heterodyne mode or a lower side heterodyne mode;
   measuring a signal intensity of the IF signal;
   measuring a squelch voltage in the IF signal subjected to detection, if the signal intensity in the upper side heterodyne mode and the signal intensity in the lower side heterodyne mode are both higher than a first threshold value;

determining that a signal is available at a frequency of the RF signal if the squelch voltage is lower than a second threshold value; and determining that a signal is not available at the frequency of the RF signal if at least one of the signal intensity in the upper side heterodyne mode and the signal intensity in the lower side heterodyne mode is equal to or lower than the first threshold value, or if the squelch voltage is equal to or higher than the second threshold value, wherein a scan is suspended if it is determined that a signal is available at the frequency of the RF signal while the frequency of the RF signal is being searched for in the scan, and the scan is continued if it is determined that a signal is not available at the frequency of the RF signal.

* * * * *